United States Patent
Tsunoda (10) Patent No.: US 8,092,953 B2
(45) Date of Patent: Jan. 10, 2012

(54) FUEL CELL SYSTEM AND METHOD OF OPERATING THE FUEL CELL SYSTEM

(75) Inventor: Tadashi Tsunoda, Nerima-ku (JP)

(73) Assignee: Honda Motor Co., Ltd., Tokyo (JP)

( * ) Notice: Subject to any disclaimer, the term of this patent is extended or adjusted under 35 U.S.C. 154(b) by 658 days.

(21) Appl. No.: 12/196,009

(22) Filed: Aug. 21, 2008

(65) Prior Publication Data

US 2009/0061270 A1 Mar. 5, 2009

(30) Foreign Application Priority Data

Aug. 28, 2007 (JP) ................................. 2007-221574

(51) Int. Cl.
*H01M 8/12* (2006.01)
*H01M 8/04* (2006.01)
(52) U.S. Cl. ..................... 429/495; 429/433; 429/436
(58) Field of Classification Search .......... 429/433–436, 429/495
See application file for complete search history.

(56) References Cited

FOREIGN PATENT DOCUMENTS

| JP | 9-45349 | 2/1997 |
|---|---|---|
| JP | 2001-185167 | 7/2001 |
| JP | 2003-187843 | 7/2003 |
| JP | 2005-49070 | 2/2005 |
| JP | 2006-73316 | 3/2006 |

*Primary Examiner* — Gregg Cantelmo
(74) *Attorney, Agent, or Firm* — Nelson Mullins Riley & Scarborough LLP; Anthony A. Laurentano (57) ABSTRACT

A fuel cell system includes a fuel cell stack, a combustor, a heat exchanger, and heat utilization equipment. Further, the fuel cell system includes a bypass channel and a control device. In the bypass channel, at least some of heat medium produced in the combustor is supplied to the heat utilization equipment, bypassing the heat exchanger. The control unit adjusts the supply of the heat energy supplied to the fuel cell stack through an oxygen-containing gas heated by the heat exchanger, and adjusts the heat energy of the heat medium which passes through the bypass channel, and which is supplied to the heat utilization equipment.

16 Claims, 12 Drawing Sheets

FUEL CELL SYSTEM AND METHOD OF OPERATING THE FUEL CELL SYSTEM

BACKGROUND OF THE INVENTION

1. Field of the Invention

The present invention relates to a fuel cell system including a fuel cell stack, a combustor, a heat exchanger, and heat utilization equipment. Further, the present invention relates to a method of operating the fuel cell system.

2. Description of the Related Art

Typically, a solid oxide fuel cell (SOFC) employs a solid electrolyte of ion-conductive solid oxide such as stabilized zirconia. The solid electrolyte is interposed between an anode and a cathode to form an electrolyte electrode assembly. The electrolyte electrode assembly is interposed between separators (bipolar plates). In use, generally, predetermined numbers of the electrolyte electrode assemblies and the separators are stacked together to form a fuel cell stack.

Since the fuel cell stack of this type is operated at high temperature (e.g., about 800° C.), the fuel cell is suitably adopted in cogeneration, e.g., for heating water using the waste heat to supply hot water.

Figure 11:
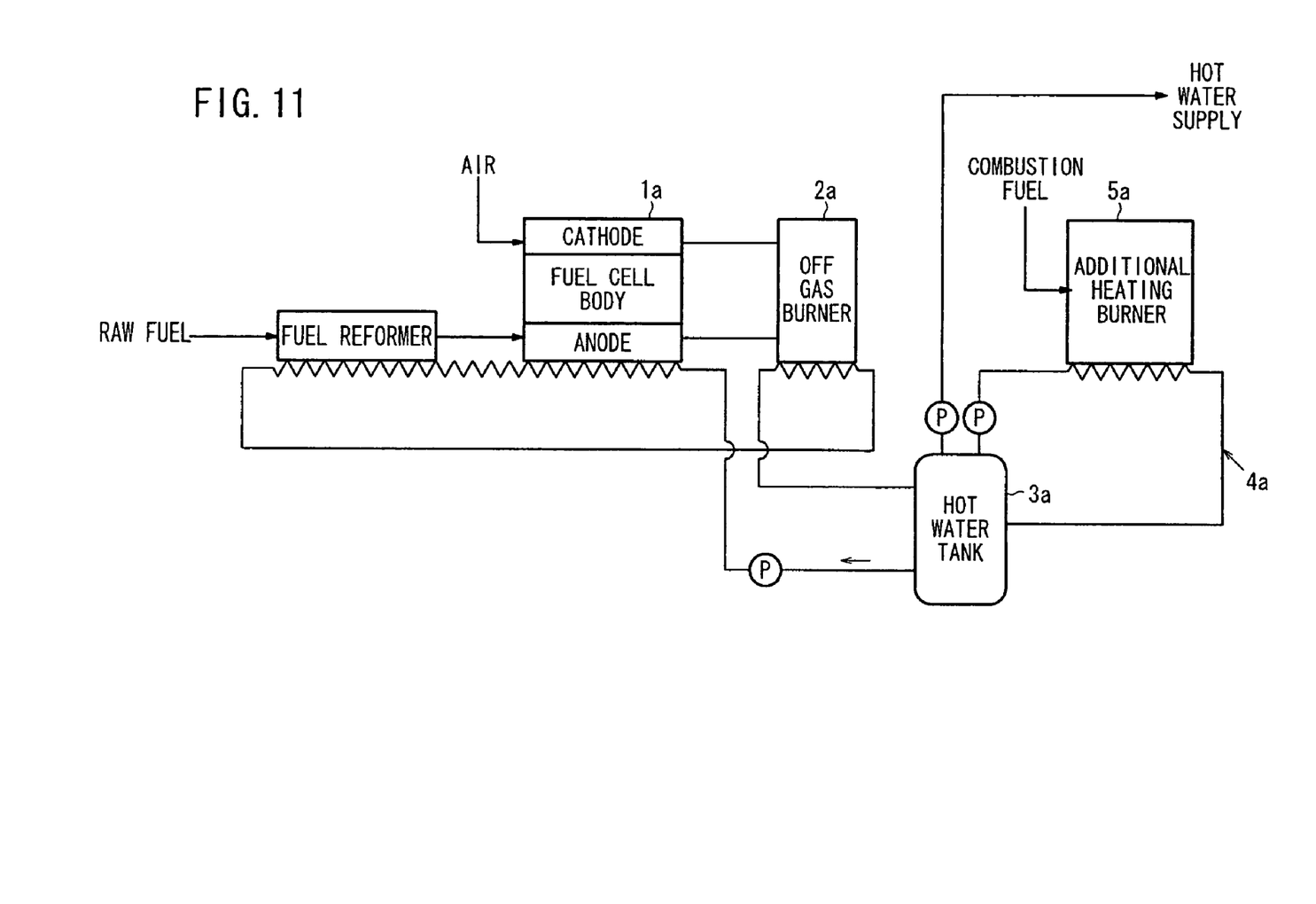
FIG. 11 is a diagram showing a system disclosed in Japanese Laid-Open Patent Publication No. 2001-185167.

For example, in a fuel cell cogeneration system disclosed in Japanese Laid-Open Patent Publication No. 2001-185167, as shown in FIG. 11, an off gas burner 2a for burning the off gas from a fuel cell 1a is provided downstream of the fuel cell 1a. A tank 3a filled with hot water is provided in a water heating system using the waste heat of the off gas burner 2a for heating a heat medium. An additional heating burner 5a is provided in a water circuit 4a connected to the tank 3a. Oxidation catalyst for burning a combustion fuel (city gas) is filled in the additional heating burner 5a.

According to the disclosure, it is possible to heat water in the tank 3a using the waste heat of the off gas burner 2a and the combustion heat of the additional heating burner 5a, and the high temperature of the water in the tank 3a is maintained at all times.

Figure 12:
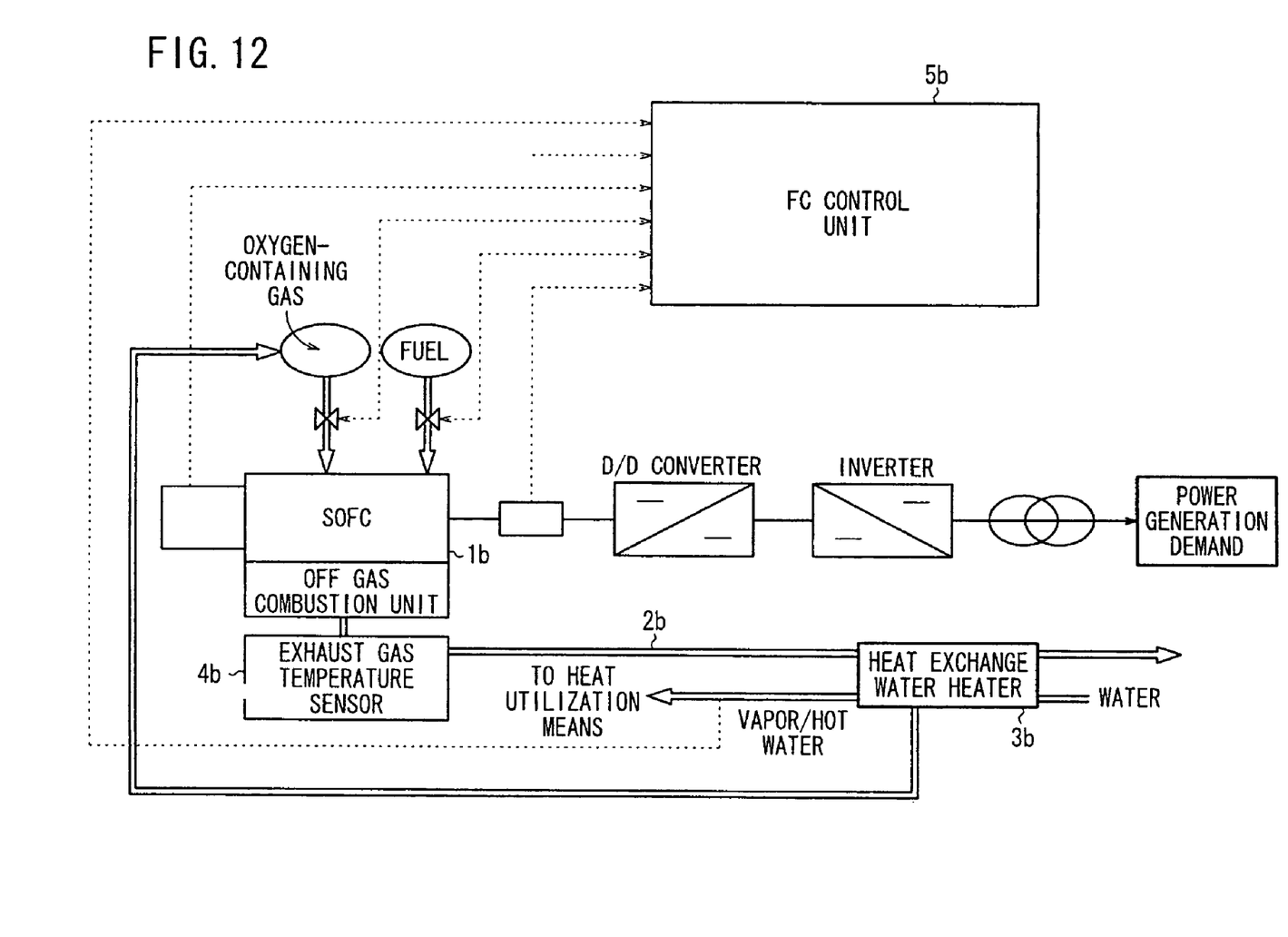
FIG. 12 is a diagram showing a system disclosed in Japanese Laid-Open Patent Publication No. 2006-073316.

Further, Japanese Laid-Open Patent Publication No. 2006-073316 discloses a fuel cell cogeneration system and a method of controlling the fuel cell cogeneration system. As shown in FIG. 12, the fuel cell cogeneration system includes a fuel cell 1b operated at high temperature, a heat exchanger 3b provided in an exhaust gas system 2b of the fuel cell 1b for supplying the waste heat from the fuel cell 1b to heat demanding components, monitor means 4b for monitoring the operating state of the fuel cell 1b, and a control unit 5b. The control unit 5b implements control for changing the power generation output of the fuel cell 1b and/or the exhaust gas temperature of the fuel cell 1b in correspondence with the change in the heat demand.

However, in Japanese Laid-Open Patent Publication No. 2001-185167, two burners, i.e., the off gas burner 2a and the additional heating burner 5a need to be provided. Therefore, a large space is required for these burners, and it is difficult to reduce the overall size of the system, and the cost of the system is high.

Further, in Japanese Laid-Open Patent Publication No. 2006-073316, since the fuel utilization ratio or the like is changed depending on the heat demand, the amount of the fuel gas supplied to the fuel cell 1b is changed. Thus, the conditions in power generation reactions in the fuel cell 1b (reaction temperature and current density) are not stable.

SUMMARY OF THE INVENTION

A main object of the present invention is to provide a fuel cell system having simple and economical structure and a method of operating the fuel cell system in which it is possible to suitably satisfy heat requests in a state where steady operation of a fuel cell stack is maintained.

The present invention relates to a fuel cell system comprising a fuel cell stack for performing power generation by electrochemical reactions of a fuel gas and an oxygen-containing gas, a combustor for burning an exhaust gas discharged from the fuel cell stack during power generation to produce a heat medium, a heat exchanger for heating the oxygen-containing gas by the heat medium before the oxygen-containing gas is supplied to the fuel cell stack, and heat utilization equipment for utilizing the heat medium after heat exchange. The combustor is provided downstream of the fuel cell stack, the heat exchanger is provided downstream of the combustor, and the heat utilization equipment is provided downstream of the heat exchanger. Further, the present invention relates to a method of operating the fuel cell system.

The fuel cell system includes a bypass channel for supplying at least part of the heat medium produced in the combustor to the heat utilization equipment, bypassing the heat exchanger, and a control device for adjusting supply of heat energy supplied to the fuel cell stack through the oxygen-containing gas heated by the heat exchanger, and adjusting supply of heat energy of the heat medium passing through the bypass channel to the heat utilization equipment.

In the present invention, while stably supplying the heat energy required for power generation operation under certain temperature conditions to the fuel cell stack, it is possible to supply the heat energy to the heat utilization equipment to satisfy the heat request from the heat utilization equipment. In this manner, regardless of the operating state of the heat utilization equipment, it is possible to reliably achieve the stable, and steady operation of the fuel cell stack. Further, since it is sufficient to simply provide the single combustor, the desired small and economical structure is achieved. While maintaining the steady operation of the fuel cell stack, it is possible to suitably satisfy the heat request.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
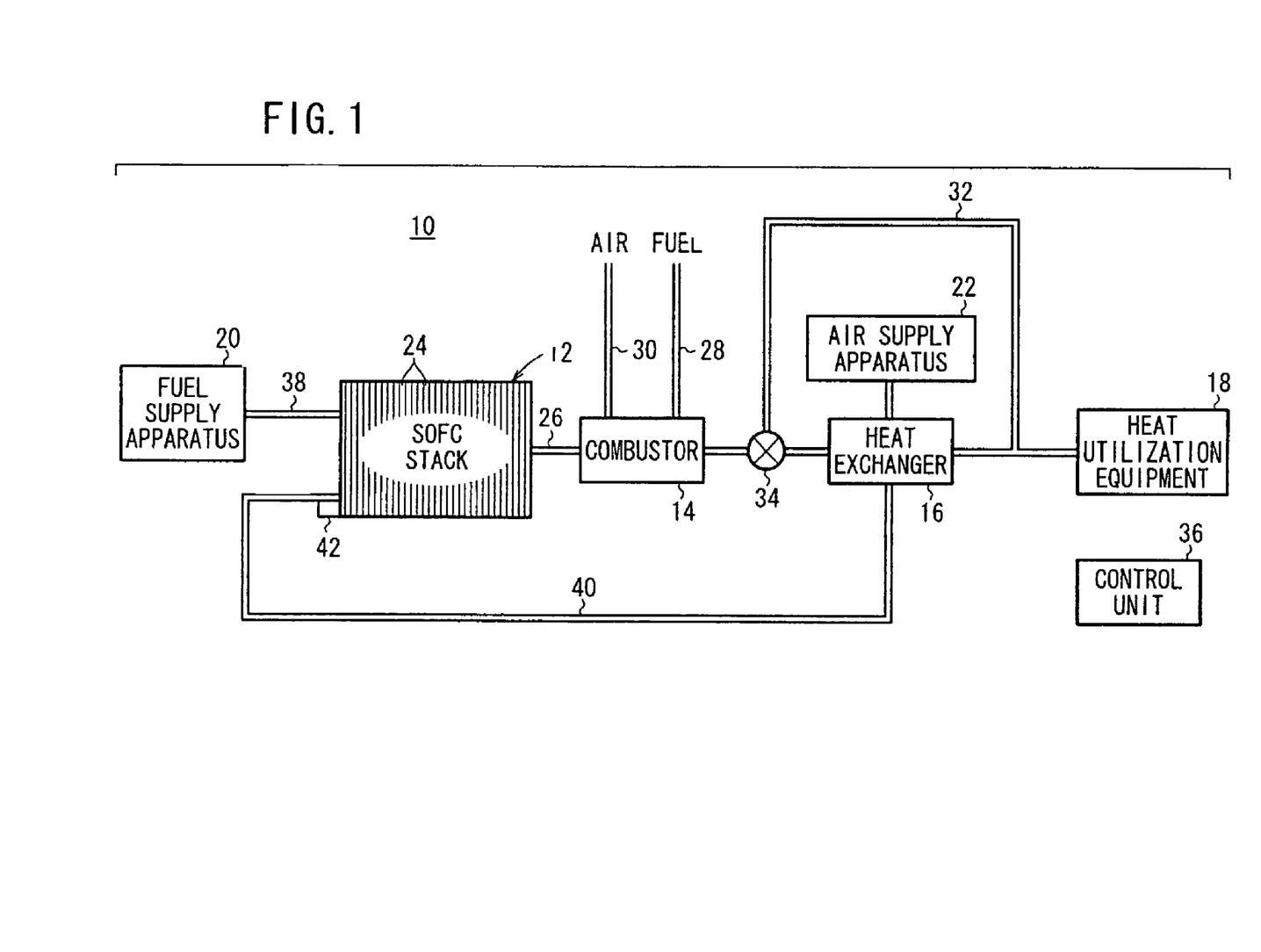
FIG. 1 is a diagram schematically showing structure of a fuel cell system according to an embodiment of the present invention.

As shown in FIG. 1, a fuel cell system 10 includes a fuel cell stack 12 for performing power generation by electrochemical reactions of a fuel gas and an oxygen-containing gas, a combustor (e.g., burner) 14 for burning an exhaust gas discharged from the fuel cell stack 12 at the time of power generation to produce a heat medium, a heat exchanger 16 for heating the oxygen-containing gas using the heat medium before the oxygen-containing gas is supplied to the fuel cell stack 12, and heat utilization equipment 18 utilizing the heat medium after heat exchange.

The combustor 14 is provided downstream of the fuel cell stack 12, the heat exchanger 16 is provided downstream of the combustor 14, and the heat utilization equipment 18 is provided downstream of the heat exchanger 16. A fuel supply apparatus 20 and an air supply apparatus 22 are connected to the fuel cell stack 12.

The fuel cell stack 12 includes solid oxide fuel cells 24 each formed by stacking an electrolyte electrode assembly and a separator. Though not shown, the electrolyte electrode assembly includes an anode and a cathode, and a solid electrolyte (solid oxide) interposed between the anode and the cathode. The solid electrolyte is composed of ion-conductive solid oxide such as stabilized zirconia. The fuel cells 24 are stacked in a vertical direction or in a horizontal direction to form the solid oxide fuel cell stack 12.

An exhaust gas channel 26 for discharging the fuel gas and the oxygen-containing gas after consumption as an exhaust gas is connected to fuel cell stack 12, and the combustor 14 is connected to a position in the middle of the exhaust gas channel 26.

The combustor 14 has a function of allowing the exhaust gas discharged from the fuel cell stack 12 to pass through the combustor 14 when operation of the combustor 14 is stopped, a function of producing a combustion gas by burning an unconsumed fuel gas remaining in the exhaust gas discharged from the fuel cell stack 12, and a function (additional heating function) of producing a combustion gas by burning a combustion fuel (fuel gas) supplied from a fuel inlet channel 28 using a combustion air (oxygen-containing gas) supplied from an air inlet channel 30. It should be noted that the exhaust gas discharged from the fuel cell stack 12 is burned immediately after it is discharged from the fuel cell stack 12 (so called after burning), and then, the exhaust gas passes through the combustor 14 when operation of the combustor 14 is stopped. The exhaust gas is supplied to the heat exchanger 16 for heating the oxygen-containing gas.

The exhaust gas channel 26 is connected to a bypass channel 32. In the bypass channel 32, at least part of the heat medium produced in the fuel cell stack 12 or the combustor 14 bypasses the heat exchanger 16, and the heat medium is supplied to the heat utilization equipment 18. A variable valve 34 for adjusting the distribution ratio of the heat energy of the heat medium passing through the bypass passage 32 and the heat energy of the heat medium passing through the heat exchanger 16 is provided at a connecting position between the exhaust gas channel 26 and the bypass channel 32.

The fuel cell system 10 includes a control unit 36 for adjusting the supply of the heat energy supplied to the fuel cell stack 12 through the fresh oxygen-containing gas before consumption (hereinafter referred to as the air) heated by the heat exchanger 16 and adjusting the heat energy of the heat medium passing through the bypass channel 32, and which is supplied to the heat utilization equipment 18. The variable valve 34 and the control unit 36 are part of a control device according to the present embodiment.

In the fuel supply apparatus 20, for example, a reformed gas is produced by reforming a raw fuel chiefly containing hydrocarbon (e.g., city gas). The reformed gas flows through a fuel gas supply channel 38 as a fuel gas, and the fuel gas is supplied to a fuel gas supply port (not shown) of the fuel cell stack 12.

The air supply apparatus 22 has an air supply channel 40 connected to the heat exchanger 16. The air supply channel 40 is connected to an oxygen-containing gas supply port (not shown) of the fuel cell stack 12. A temperature sensor 42 for detecting the temperature of the air supplied to the fuel cell stack 12 is provided at a position adjacent to the oxygen-containing gas supply port. Though not shown, a temperature sensor for detecting the temperature of the exhaust gas may be provided at a position adjacent to the exhaust gas discharge port of the fuel cell stack 12.

Operation of the fuel cell system 10 and the operation method according to the present embodiment will be described.

Figure 2:
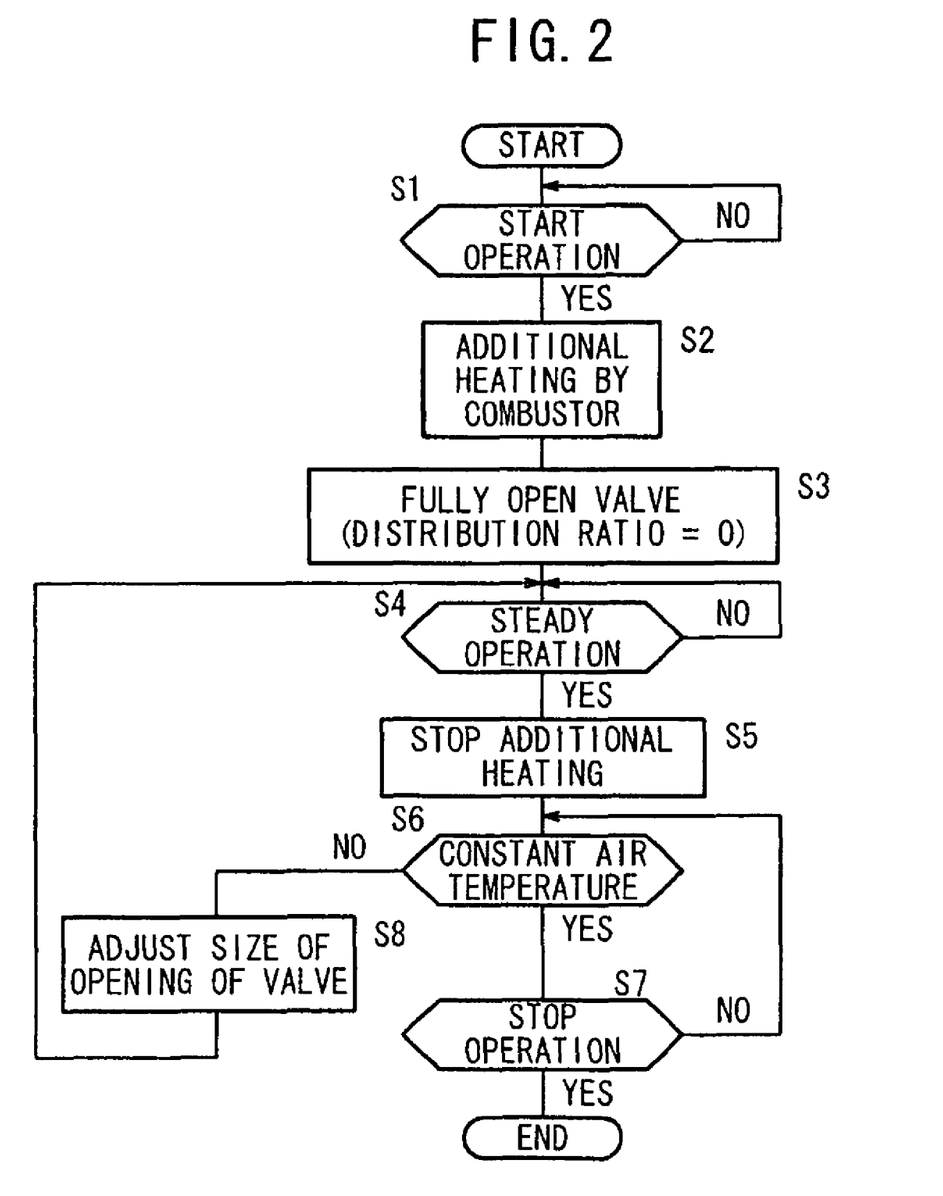
FIG. 2 is a flow chart at the time of starting operation of the fuel cell system.
Figure 3:
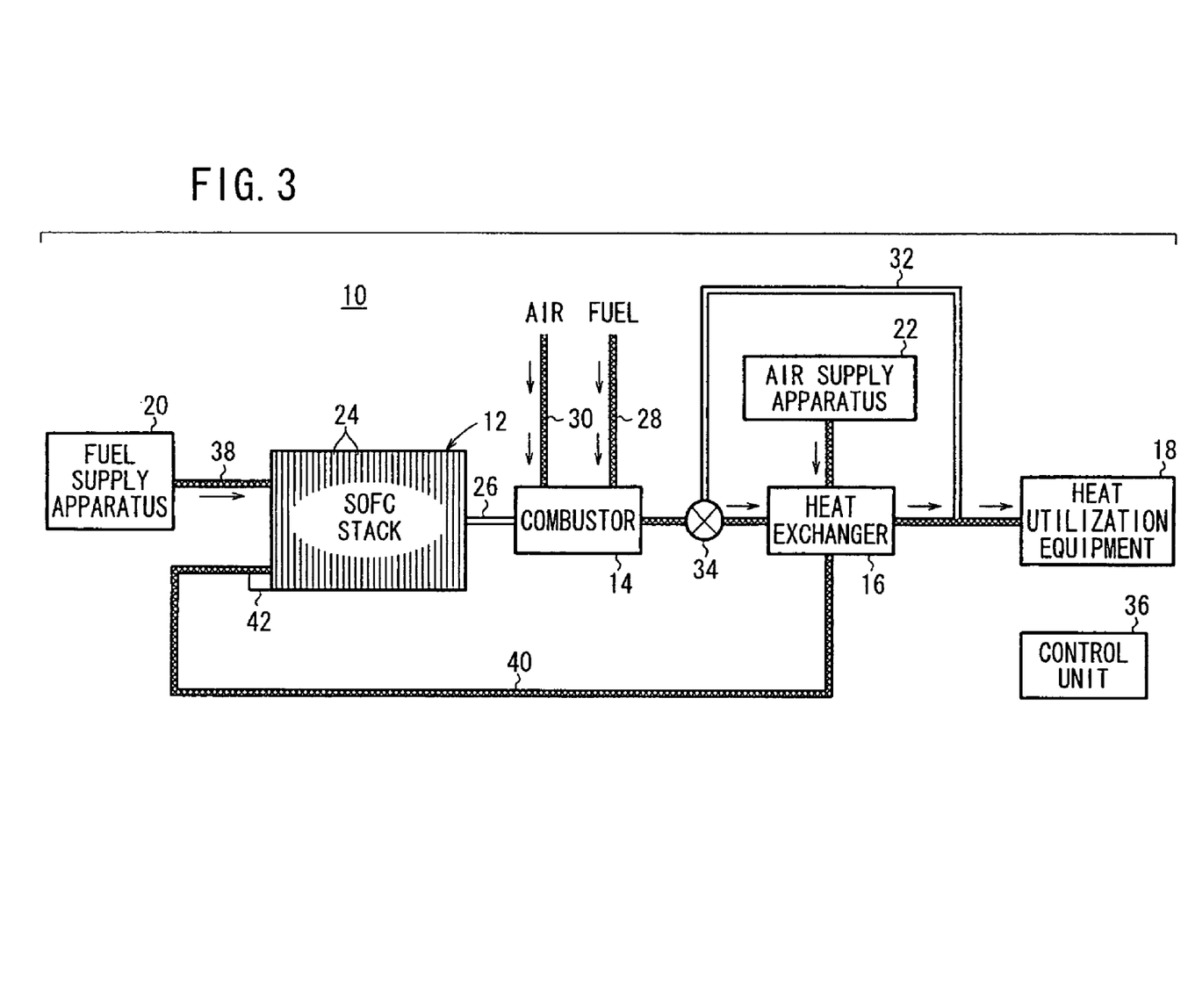
FIG. 3 is a diagram showing operation at the time of starting operation of the fuel cell system.

Firstly, a method of starting operation of the fuel cell system 10 will be described with reference to a flow chart shown in FIG. 2 and FIG. 3.

In step S1, it is determined whether the fuel cell system 10 is in an operation starting state or not. Specifically, as shown in FIG. 3, the fuel gas is supplied from the fuel supply apparatus 20 to the fuel cell stack 12 through the fuel gas supply channel 38, and the air is supplied from the air supply apparatus 22 to the fuel cell stack 12 through the air supply channel 40. Thus, power generation is ready to be started. By checking the state where the fuel gas and the air are supplied to the fuel cell stack 12, it is determined whether the fuel cell stack 12 is placed in a state before starting operation of the fuel cell stack 12.

If it is determined that the fuel cell system 10 is in the operation starting state (YES in Step S1), the routine proceeds to step S2 for performing additional heating by the combustor 14. Specifically, the combustion fuel is supplied from the fuel inlet channel 28 to the combustor 14, and the combustion air is supplied from the air inlet channel 30 to the combustor 14. Thus, combustion is performed in the combustor 14, and the combustion gas is produced.

Further, in step S3, the variable valve 34 is fully opened (distribution ratio to the bypass channel 32 is "0"). Thus, the heat medium as the combustion gas supplied from the combustor 14 does not flow into the bypass channel 32, and all the heat medium is supplied to the heat exchanger 16. Therefore, in the heat exchanger 16, the entire heat medium having the increased heat energy by additional heating using the combustor 14 undergoes heat exchange with the fresh air before consumption. Thus, the temperature of the fresh air is raised rapidly, and the hot air is supplied to the fuel cell stack 12. Accordingly, it is possible to rapidly heat the fuel cell stack 12, and improvement in starting operation of the fuel cell stack 12 is achieved.

When it is determined that the fuel cell stack 12 is in steady operation, by determining the temperature of the fuel cell stack 12 (YES in step S4), the routine proceeds to step S5 to stop additional heating by the combustor 14.

In the fuel cell stack 12, in order to induce electrochemical reactions under certain power generation conditions, it is necessary to maintain a certain level of temperature of the air supplied to the fuel cell stack 12. The certain power generation conditions herein means that the temperature of the fresh oxygen-containing gas heated by the heat exchanger 16 is maintained constant all the time during operation of the fuel cell stack 12. Therefore, simply by supplying the heated oxygen-containing gas to the fuel cell stack 12, it becomes possible to stably supply the heat energy required for steady operation of the fuel cell stack 12. For this purpose, in step S6, it is determined whether the temperature of the air detected by the temperature sensor 42 is constant or not. If it is determined that the temperature of the air is constant (YES in step S6), the routine proceeds to step S7, and the temperature of the air is maintained constant until it is determined that operation of the fuel cell system 10 is stopped.

In step S6, when it is determined that the temperature of the air is changed (NO, in step S6), the routine proceeds to step S8 for adjusting the size of the opening of the variable valve 34. Therefore, the distribution ratio of the heat energy of the heat medium supplied to the heat exchanger 16 and the heat energy of the heat medium supplied to the bypass channel 32 is adjusted, and the temperature of the air that undergoes heat exchange in the heat exchanger 16 is adjusted. In this manner, the temperature of the air supplied to the fuel cell stack 12 is maintained constant.

Next, during operation of the fuel cell stack 12 under certain operating conditions, when a heat request from the heat utilization equipment 18 is made, the following control is implemented. When additional heating is performed by the combustor 14, the heat energy of the air and the heat energy of the heat utilization equipment 18 based on the distribution ratio α of the heat medium are obtained by a relational expression shown in FIG. 4. Therefore, in the case where additional heating by the combustor 14 is not performed, and the distribution ratio is "0", the heat energy of the air supplied to the fuel cell stack 12 is ηQ.

Figure 5:
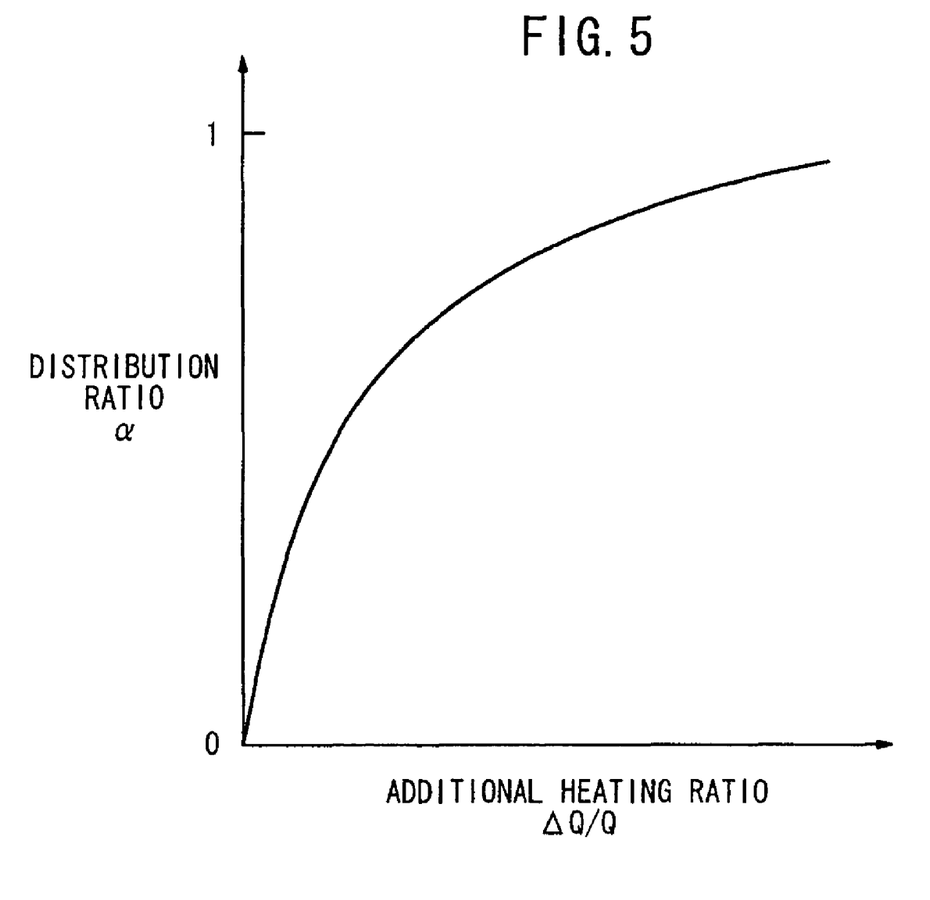
FIG. 5 is a graph showing the relationship between the additional heating ratio and the distribution ratio.

Assuming that the heat energy supplied to the fuel cell stack 12 is constant, a relational expression $\eta Q = \eta(1-\alpha)(Q+\Delta Q)$ is obtained. That is, the distribution ratio α is determined by $\alpha = 1 - Q/(Q+\Delta Q)$. Therefore, the additional heating ratio ($\Delta Q/Q$) and the distribution ratio α have the relationship as shown in FIG. 5.

Figure 4:
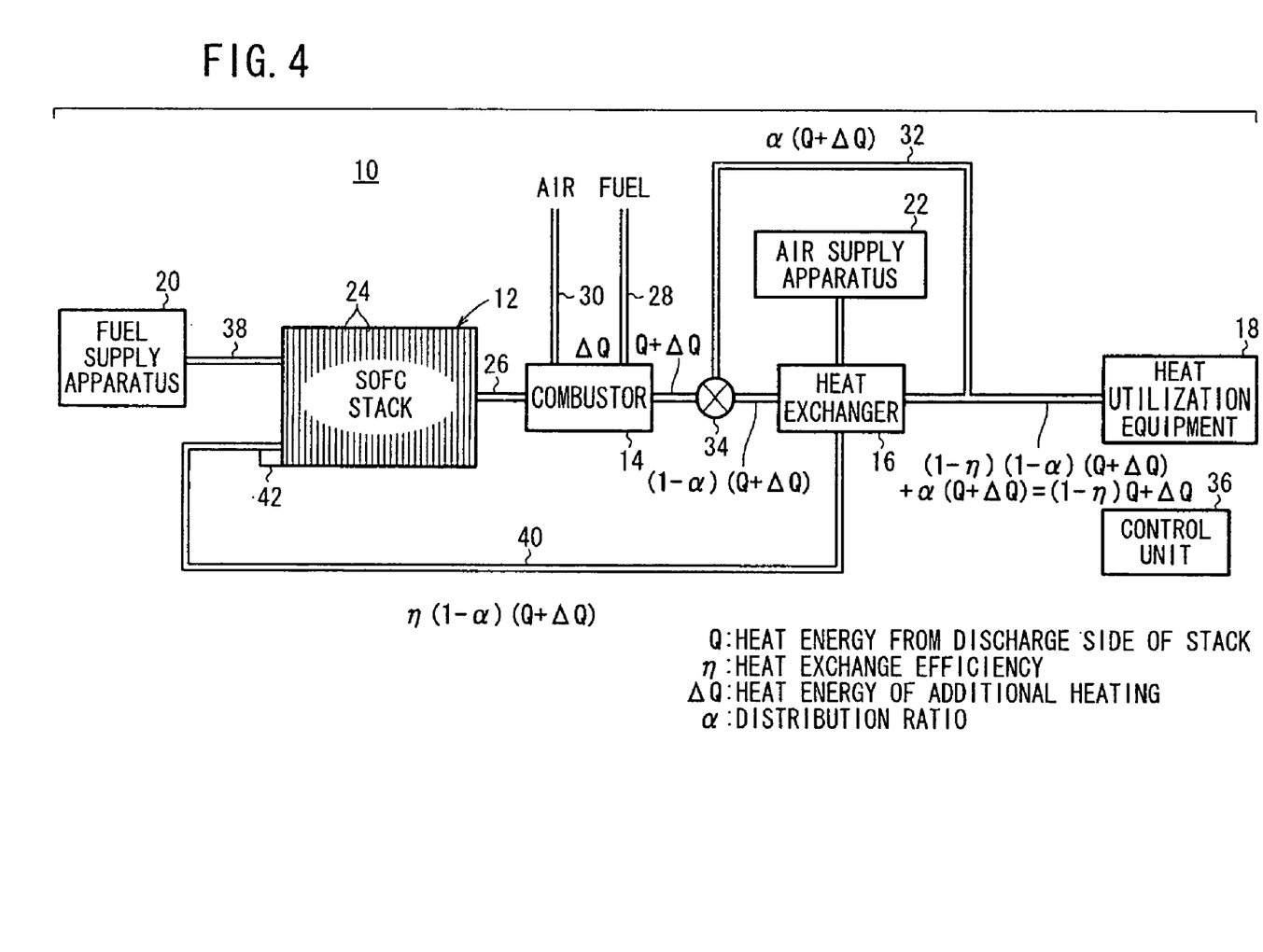
FIG. 4 is a diagram showing the heat energy at the time of additionally heating the fuel cell system.

As shown in FIG. 4, in the heat utilization equipment 18, the heat energy $(1-\eta)Q + \Delta Q$ is obtained. That is, in the heat utilization equipment 18, regardless of the distribution ratio α, the heat energy is increased by the heat energy ΔQ obtained by additional heating.

Figure 6:
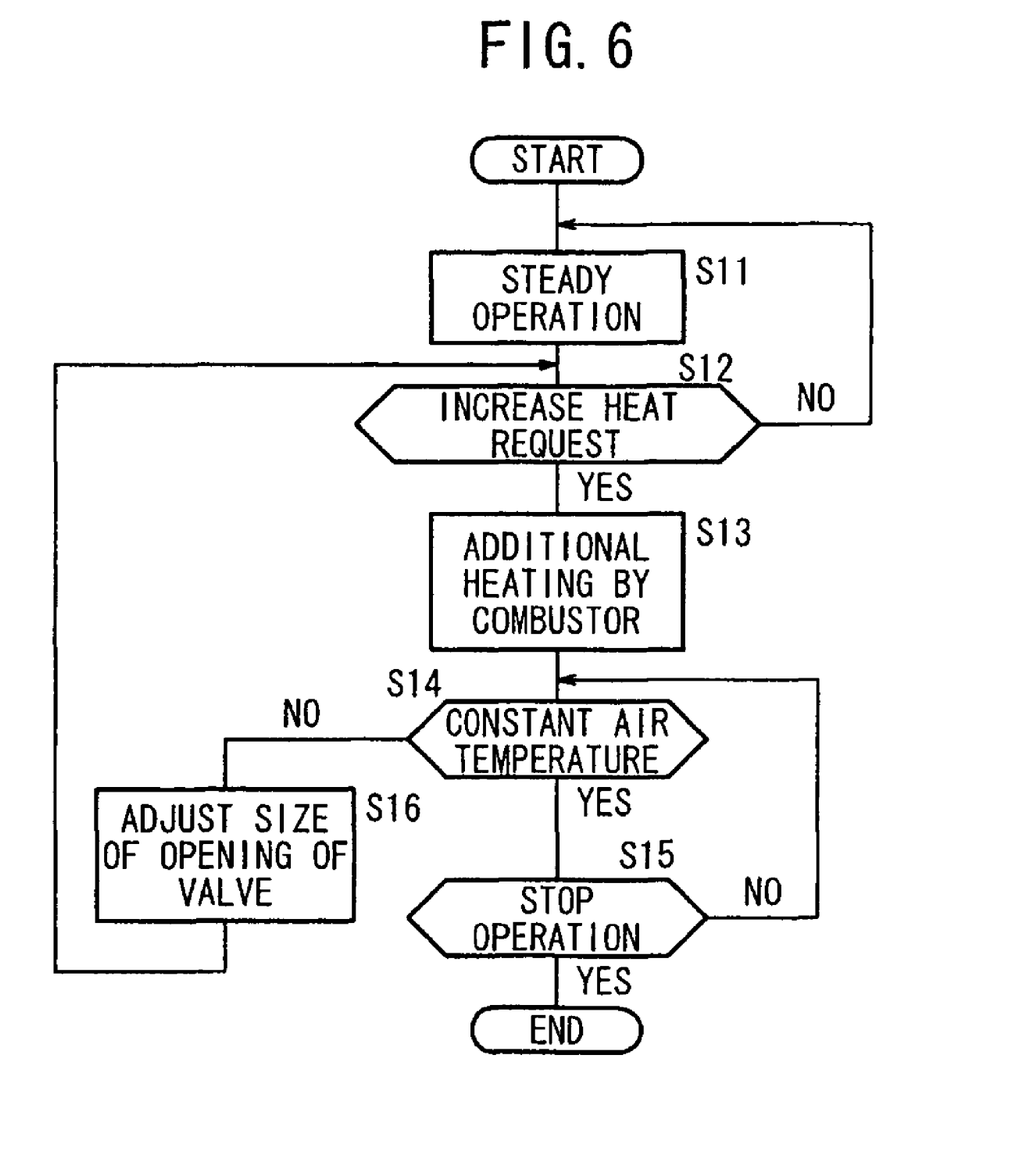
FIG. 6 is a flow chart at the time of requesting heat from the fuel cell system.

As shown in FIG. 6, during steady operation of the fuel cell system 10 (step S11), when it is determined that the heat energy requested from the heat utilization equipment 18 is increased (YES in step S12), the routine proceeds to step S13 to perform additional heating by the combustor 14. At this time, in the combustor 14, only the heat energy (ΔQ) corresponding to the heat energy requested by the heat utilization equipment 18 should be produced by additional heating.

Then, in step S14, it is determined whether the temperature of the air is constant or not. If the temperature of the air is constant (YES in step S14), the routine proceeds to step S15. If it is determined that the temperature of the air is not constant (NO in step S14), the routine proceeds to step S16. In step S16, the size of the opening of the variable valve 34 is adjusted, and the temperature of the air supplied to the fuel cell stack 12 is maintained constant.

In the embodiment of the present invention, when the heat utilization equipment 18 makes a heat request, the temperature of the fresh air heated by the heat exchanger 16 is maintained constant at all times during operation of the fuel cell stack 12. Therefore, the fuel cell stack 12 can be operated under certain power generation conditions.

Thus, even if the heat request from the heat utilization equipment 18 changes, the power generation conditions of the fuel cell stack 12 are maintained at all times. In the case where there is any excessive heat energy, additional heating by the combustor 14 is stopped, and it is possible to directly supply the excessive heat energy to the heat utilization equipment 18 through the bypass channel 32.

In the case where the heat energy supplied to the fuel cell stack 12 is insufficient, by additional heating of the combustor 14, it is possible to generate the heat energy, and supply it to the heat exchanger 16. Thus, by supplying the heated air to the fuel cell stack 12, the certain power generation conditions of the fuel cell stack 12 are maintained.

Figure 7:
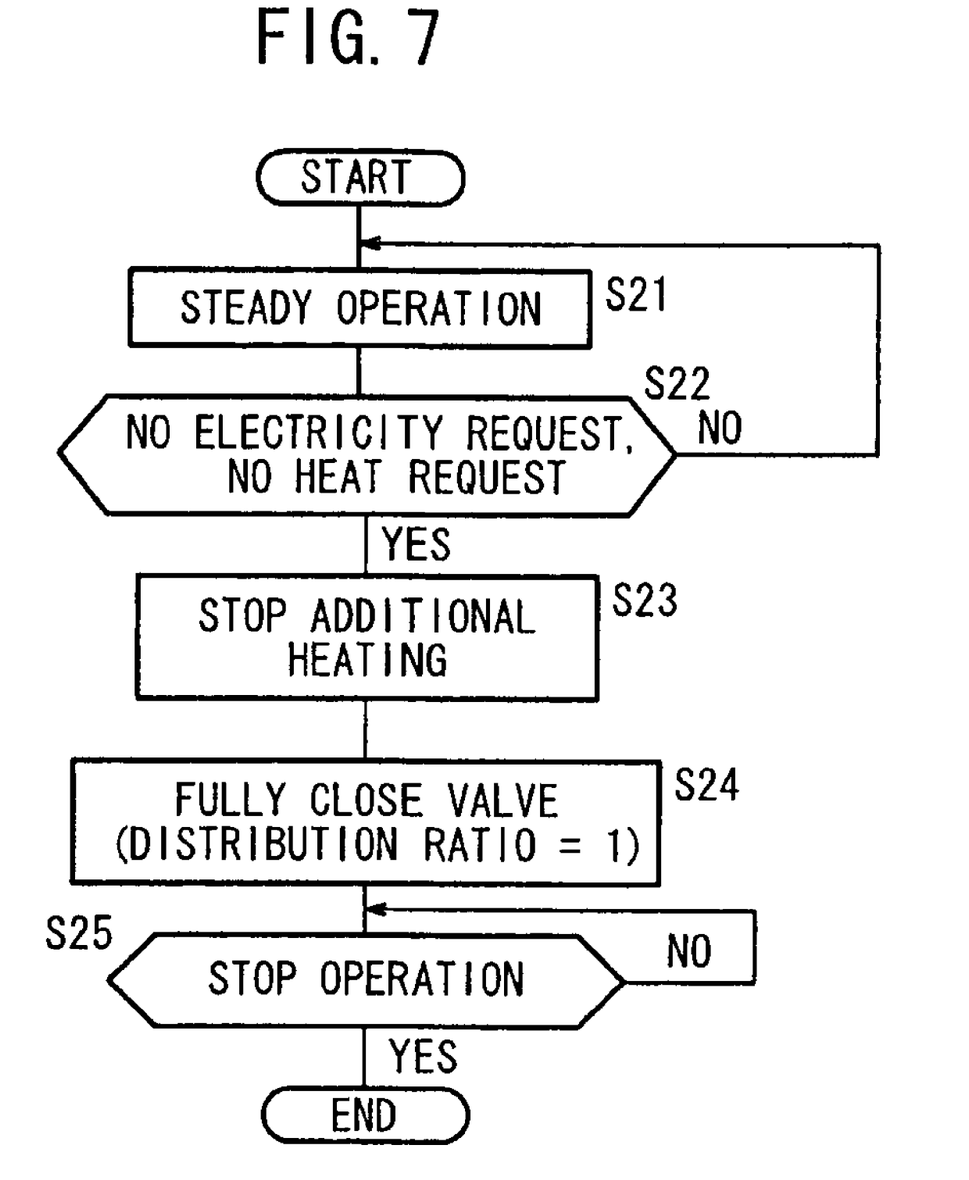
FIG. 7 is a flow chart at the time of stopping operation of the fuel cell system at early time.
Figure 8:
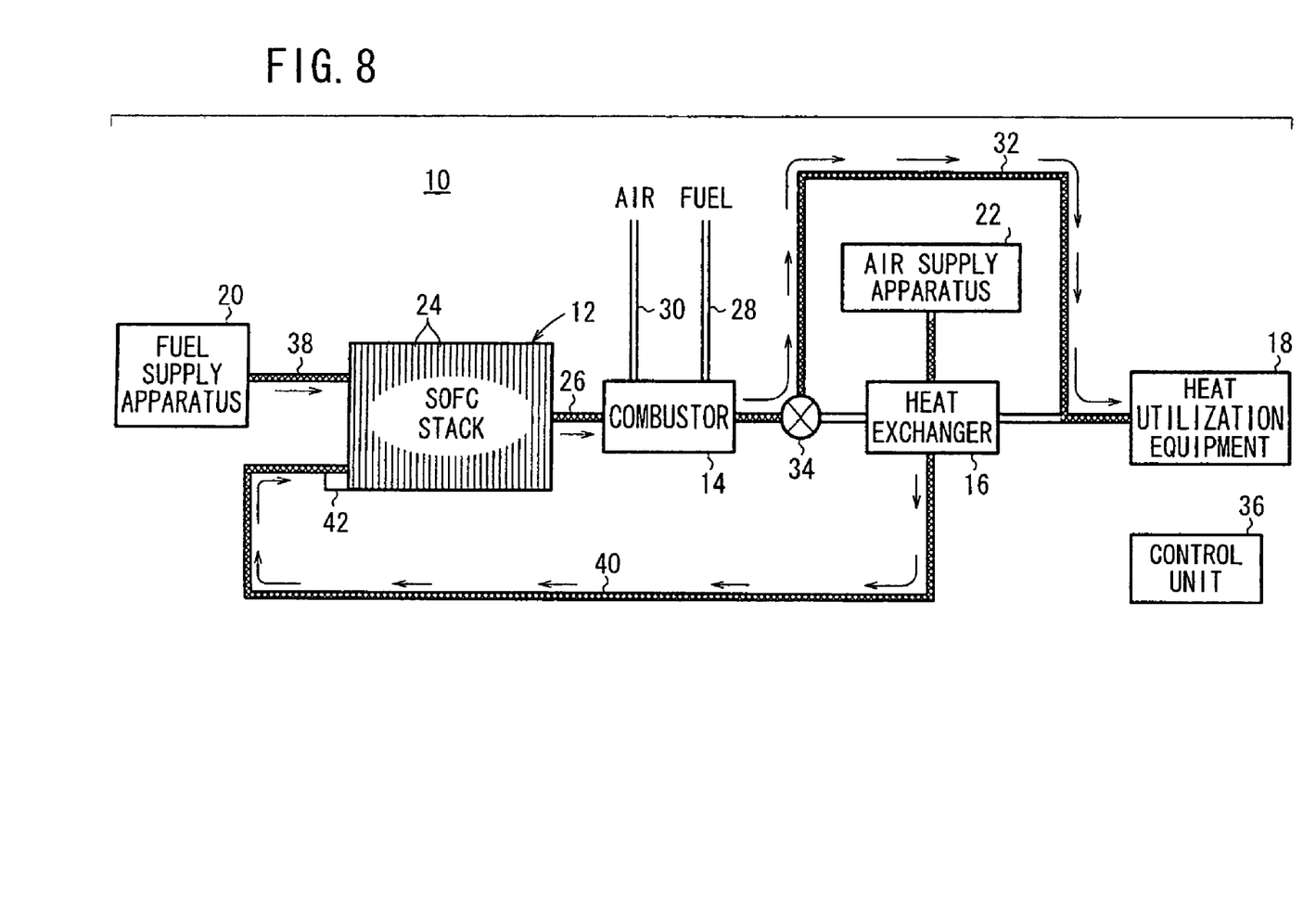
FIG. 8 is a diagram showing operation at the time of stopping operation of the fuel cell system at early time.

Next, a method of stopping the fuel cell stack 12 will be described with reference to a flow chart shown in FIG. 7 and FIG. 8.

During steady operation of the fuel cell system 10 (step S21), when the electricity request and the heat request become "0" (YES in step S22), the routine proceeds to step S23, and additional heating by the combustor 14 is stopped. Further, by closing the variable valve 34, the distribution ratio is set to "1" (step S24). Thus, as shown in FIG. 8, the entire exhaust gas from the fuel cell stack 12 is supplied from the combustor 14 to the heat utilization equipment 18 through the bypass channel 32.

Therefore, the heat medium does not flow through the heat exchanger 16, and the fresh air supplied from the air supply apparatus 22 is not heated by the heat exchanger 16. Thus, the air at the normal temperature is supplied to the fuel cell stack 12. Thus, the heat energy supplied to the fuel cell stack 12 is significantly reduced, the fuel cell stack 12 is cooled rapidly, and the time period of stopping the power operation is reduced significantly. Further, by stopping operation (YES in step S25), the process of stopping operation of the fuel cell stack 12 at early time is finished.

Figure 9:
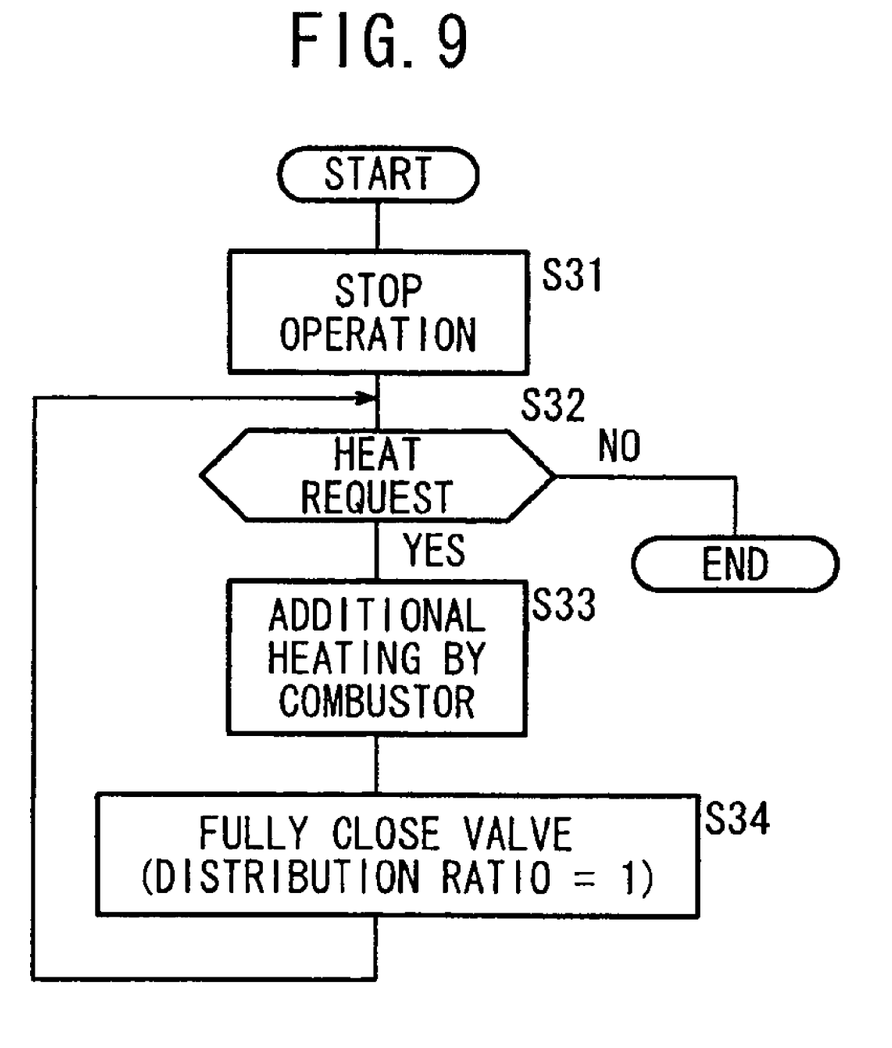
FIG. 9 is a flow chart at the time of requesting heat after stopping operation of the fuel cell system.

Further, in the present embodiment, heat can be utilized in a state where operation of the fuel cell stack 12 is stopped. That is, as shown in a flow chart shown in FIG. 9 and FIG. 10, after operation of the fuel cell stack 12 is stopped (step S31), when a heat request is made from the heat utilization equipment 18 (YES in step S32), the routine proceeds to step S33 for performing additional heating by the combustor 14.

Figure 10:
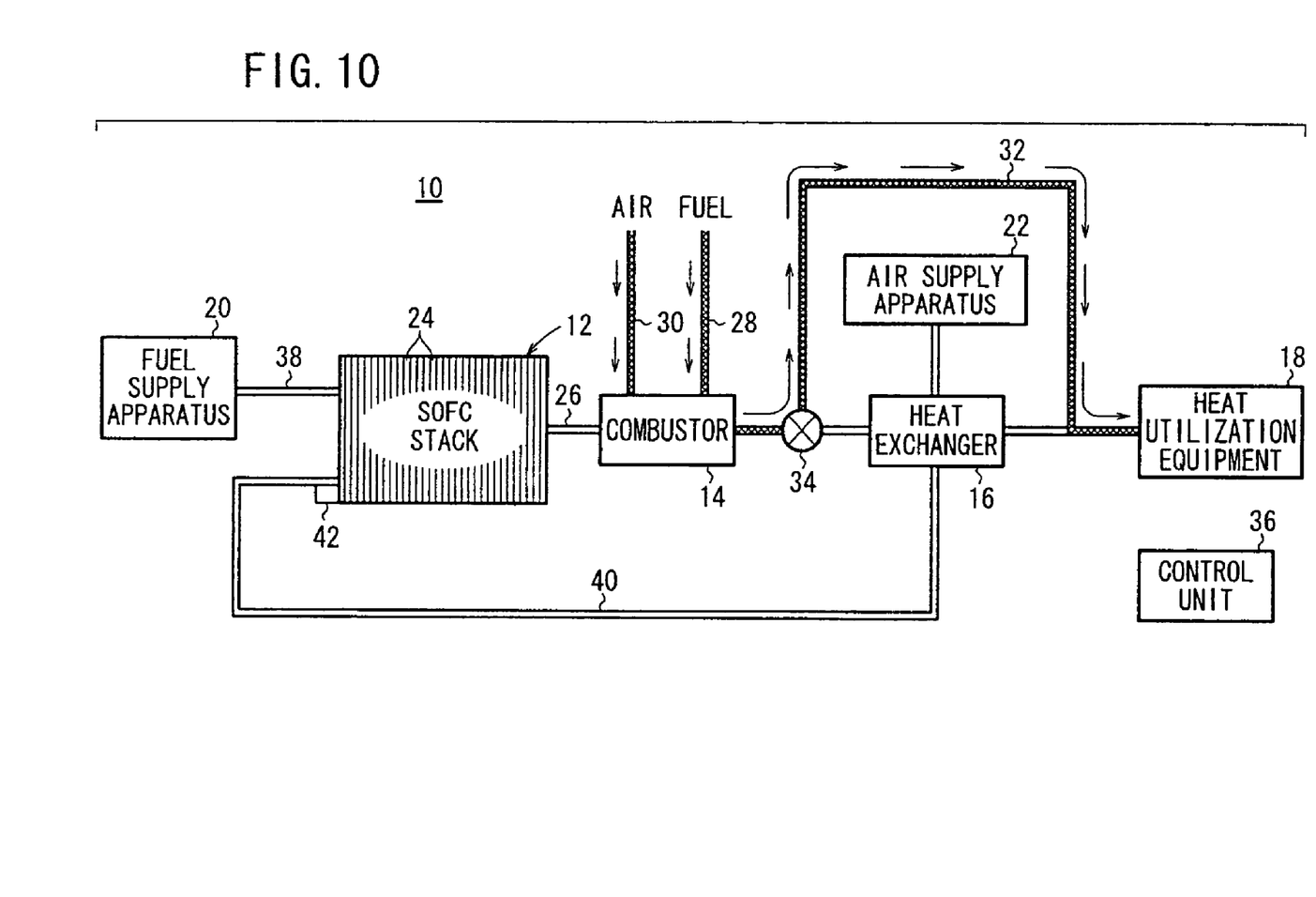
FIG. 10 is a diagram showing operation at the time of requesting heat after stopping operation of the fuel cell system.

At this time, since the variable valve 34 is fully closed (distribution ratio=1) (step S34), the entire heat medium generated by the combustor 14 is supplied to the heat utilization equipment 18 bypassing the heat exchanger 16 (see FIG. 10). Thus, even if operation of the fuel cell stack 12 is stopped, it is possible to effectively satisfy the heat demand from the heat utilization equipment 18.

As described above, in the present embodiment, while stably supplying the heat energy required for power generation operation under certain temperature conditions to the fuel cell stack 12 through the air having a certain level of the temperature at all times, the heat energy corresponding to the heat request from the heat utilization equipment 18 can be supplied to the heat utilization equipment 18. Thus, with simple and economical structure, regardless of the operating conditions of the heat utilization equipment 18, the stable and steady operation of the fuel cell stack 12 is maintained reliably.

While the invention has been particularly shown and described with reference to a preferred embodiment, it will be understood that variations and modifications can be effected thereto by those skilled in the art without departing from the spirit and scope of the invention as defined by the appended claims.

What is claimed is:

1. A solid oxide fuel cell system comprising:
a fuel cell stack for performing power generation by electrochemical reactions of a fuel gas and an oxygen-containing gas;
a combustor for burning an exhaust gas discharged from the fuel cell stack during power generation to produce a heat medium;
a heat exchanger for heating the oxygen-containing gas by the heat medium to generate a heated oxygen-containing gas, and for supplying the heated oxygen-containing gas to the fuel cell stack;
heat utilization equipment for utilizing the heat medium after heat exchange, the combustor being provided downstream of the fuel cell stack, the heat exchanger being provided downstream of the combustor, the heat utilization equipment being provided downstream of the heat exchanger;
a bypass channel for supplying at least part of the heat medium produced in the combustor to the heat utilization equipment, bypassing the heat exchanger; and
a control device for adjusting supply of heat energy supplied to the fuel cell stack through the oxygen-containing gas heated by the heat exchanger, and adjusting supply of heat energy of the heat medium passing through the bypass channel to the heat utilization equipment.

2. A fuel cell system according to claim 1, wherein the control device includes a variable valve for adjusting a distribution ratio of the heat energy of the heat medium passing through the bypass passage and the heat energy of the heat medium passing through the heat exchanger.

3. A fuel cell system according to claim 1, wherein the control device supplies heat energy required for inducing electrochemical reactions in the fuel cell stack under a certain power generation condition, to the oxygen-containing gas before consumption through the heat medium.

4. A fuel cell system according to claim 3, wherein, when a heat request is made by the heat utilization equipment, the control device operates the combustor as necessary for allowing heat energy required for operation of the fuel cell stack under a certain power generation condition to undergo heat exchange with the oxygen-containing gas in the heat exchanger.

5. A fuel cell system according to claim 3, wherein, at the time of starting operation of the fuel cell stack, the control device implements control to operate the combustor to produce the heat medium, and supply the entire heat medium to the heat exchanger.

6. A fuel cell system according to claim 3, wherein, at the time of stopping operation of the fuel cell stack, the control device implements control to stop operation of the combustor to stop production of the heat medium, and supply the entire exhaust gas to the heat utilization equipment, bypassing the heat exchanger.

7. A fuel cell system according to claim 3, wherein, when a heat request is made by the heat utilization equipment in a state where operation of the fuel cell stack is stopped, the control device implements control to operate the combustor to produce the heat medium, and supply the entire heat medium to the heat utilization equipment, bypassing the heat exchanger.

8. A fuel cell system according to claim 1, wherein the heat medium is at least any of the exhaust gas discharged from the fuel cell stack during the power generation, a combustion gas produced by burning the exhaust gas in the combustor, and a combustion gas produced by burning the oxygen-containing gas and the fuel gas in the combustor.

9. A method of operating a solid oxide fuel cell system, the fuel cell system comprising:
a fuel cell stack for performing power generation by electrochemical reactions of a fuel gas and an oxygen-containing gas;
a combustor for burning an exhaust gas discharged from the fuel cell stack during the power generation to produce a heat medium;
a heat exchanger for heating the oxygen-containing gas by the heat medium to generate a heated oxygen-containing gas, and for supplying the heated oxygen-containing gas to the fuel cell stack; and
heat utilization equipment for utilizing the heat medium after heat exchange, the combustor being provided downstream of the fuel cell stack, the heat exchanger being provided downstream of the combustor, the heat utilization equipment being provided downstream of the heat exchanger,
the method comprising the steps of:
supplying the heat medium produced in the combustor to the heat exchanger to heat the oxygen-containing gas, supplying the heated oxygen-containing gas to the fuel cell stack, and supplying the heat medium to the heat utilization equipment after heat exchange; and
supplying at least part of the heat medium to the heat utilization equipment through a bypass channel bypassing the heat exchanger.

10. An operating method according to claim 9, wherein a distribution ratio of the heat energy of the heat medium passing through the bypass passage and the heat energy of the heat medium passing through the heat exchanger is adjusted.

11. An operating method according to claim 9, wherein heat energy required for inducing electrochemical reactions in the fuel cell stack under a certain power generation condition is supplied to the oxygen-containing gas before consumption through the heat medium.

12. An operating method according to claim 11, wherein, when a heat request is made by the heat utilization equipment, the combustor is operated as necessary for allowing heat energy required for operation of the fuel cell stack under a certain power generation condition to undergo heat exchange with the oxygen-containing gas in the heat exchanger.

13. An operating method according to claim 11, wherein, at the time of starting operation of the fuel cell stack, the combustor is operated to produce the heat medium, and the entire heat medium is supplied to the heat exchanger.

14. An operating method according to claim 11, wherein, at the time of stopping operation of the fuel cell stack, operation of the combustor is stopped to stop production of the heat medium, and the entire exhaust gas is supplied to the heat utilization equipment, bypassing the heat exchanger.

15. An operating method according to claim 11, wherein, when a heat request is made by the heat utilization equipment in a state where operation of the fuel cell stack is stopped, the combustor is operated to produce the heat medium, and the entire heat medium is supplied to the heat utilization equipment, bypassing the heat exchanger.

16. An operating method according to claim 9, wherein the heat medium is at least any of the exhaust gas discharged from the fuel cell stack during the power generation, a combustion gas produced by burning the exhaust gas in the combustor, and a combustion gas produced by burning the oxygen-containing gas and the fuel gas in the combustor.

* * * * *